United States Patent [19]

Troy

[11] Patent Number: 4,592,381
[45] Date of Patent: Jun. 3, 1986

[54] MULTIPLE STAGE DEVICE FOR CONDENSATE REMOVAL FROM A STEAM PIPING SYSTEM

[75] Inventor: Michael Troy, Westmont, Ill.

[73] Assignee: Engineering Resources, Inc., Chicago, Ill.

[21] Appl. No.: 577,687

[22] Filed: Feb. 7, 1984

[51] Int. Cl.⁴ .............................................. F16T 1/34
[52] U.S. Cl. .................................. 137/203; 137/549; 137/183
[58] Field of Search ............... 137/203, 204, 183, 549, 137/334; 138/44

[56] References Cited

U.S. PATENT DOCUMENTS

| | | | |
|---|---|---|---|
| 1,066,057 | 7/1913 | Sharood | 137/183 |
| 1,697,343 | 1/1929 | Campbell | 137/183 X |
| 1,833,824 | 11/1931 | Campbell | 137/183 X |
| 2,225,690 | 12/1940 | Ewald | 137/549 X |
| 2,390,749 | 12/1945 | Swift | 251/117 X |
| 2,636,506 | 4/1953 | St. Clair | 137/549 X |
| 3,411,746 | 11/1968 | Scaramucci | 137/338 X |
| 3,893,473 | 7/1975 | Breece | 137/203 X |
| 4,171,209 | 10/1979 | Brown | 138/41 X |
| 4,426,213 | 1/1984 | Stavropoulos | 138/44 X |

Primary Examiner—Alan Cohan
Attorney, Agent, or Firm—Silverman, Cass & Singer, Ltd.

[57] ABSTRACT

A condensate drainage device for a steam system which includes a series-connected arrangement of orifice-type devices particularly suitable for relatively small condensate drainage capacity. The orifice-type devices are selected for installation in housings or bodies having advantageously placed heat exchanger fins which cooperate with the size of orifice devices installed for desired condensate drainage over a range of different steam system pressure and volumetric capacities requirements.

11 Claims, 5 Drawing Figures

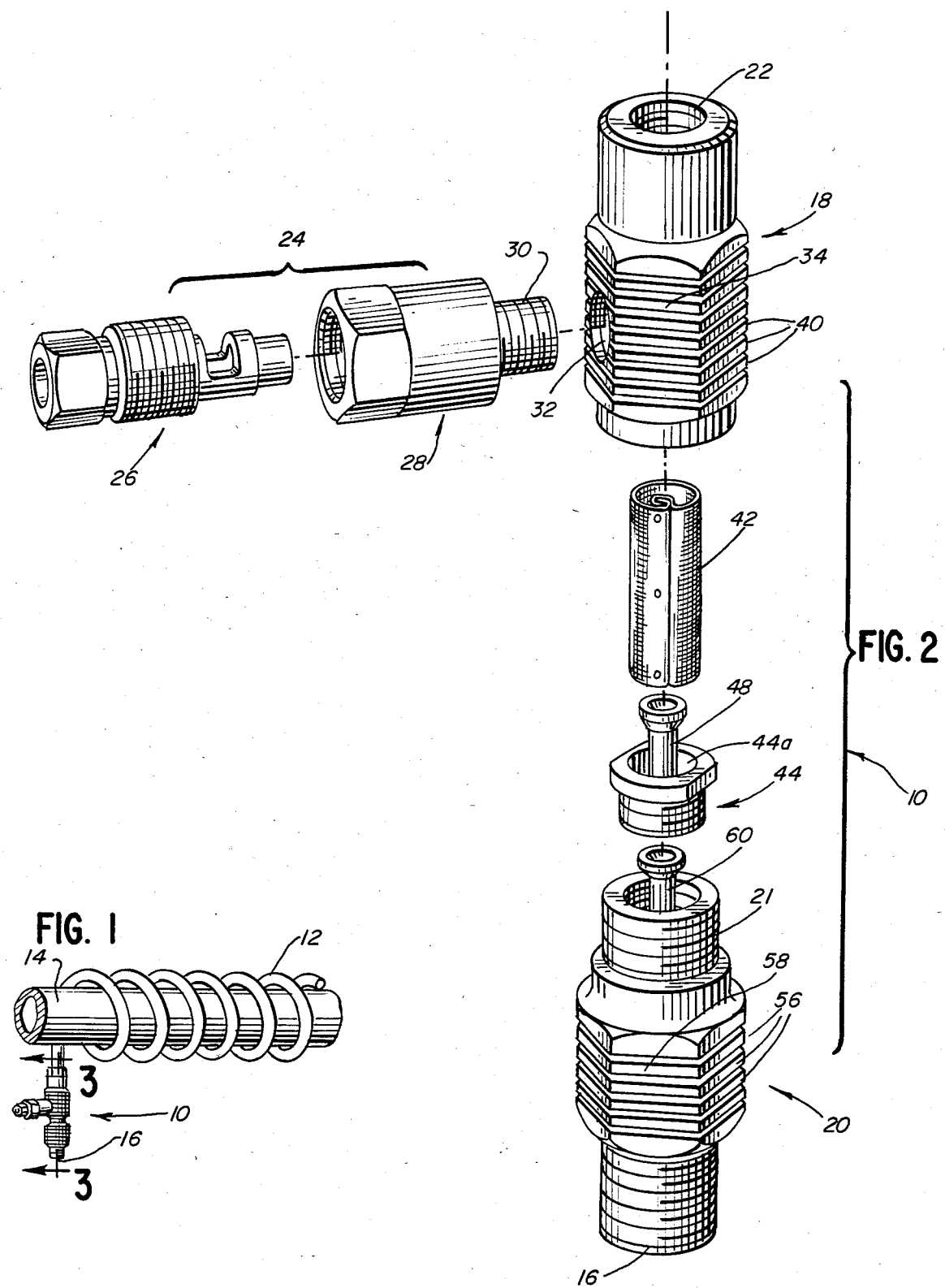

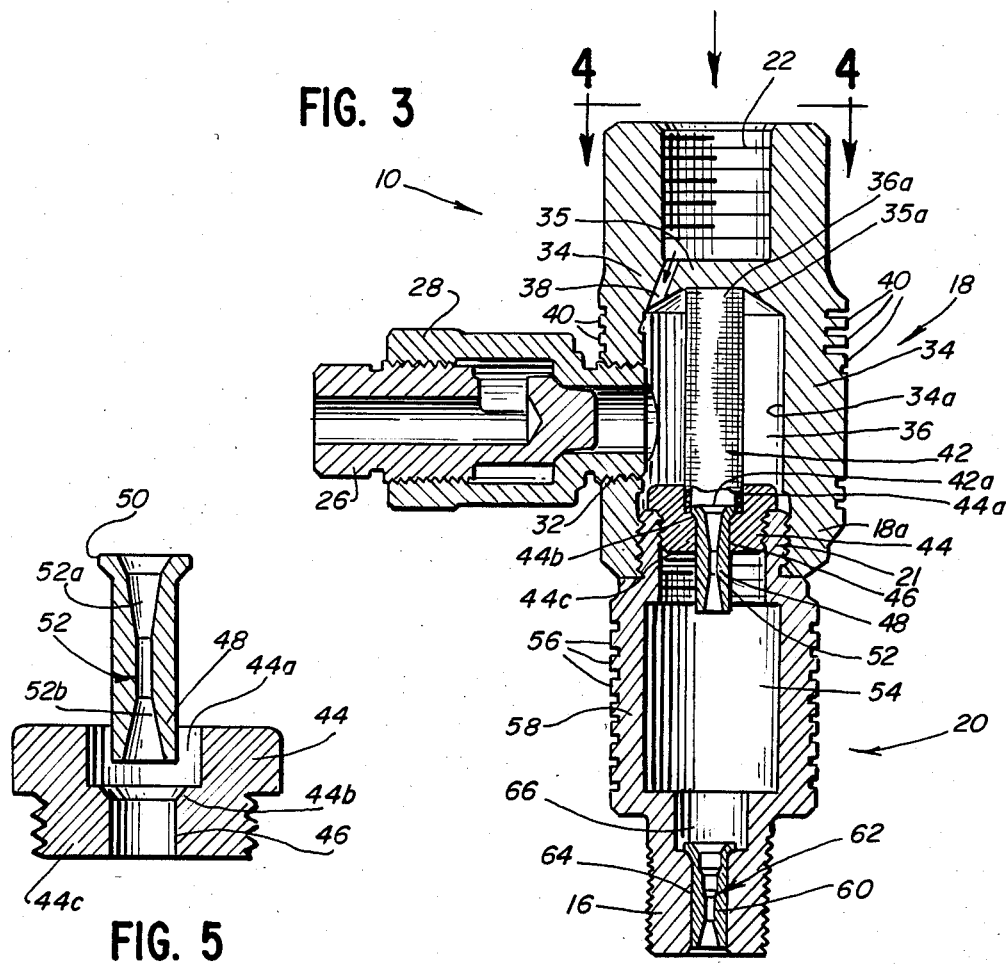
FIG. 3
FIG. 5
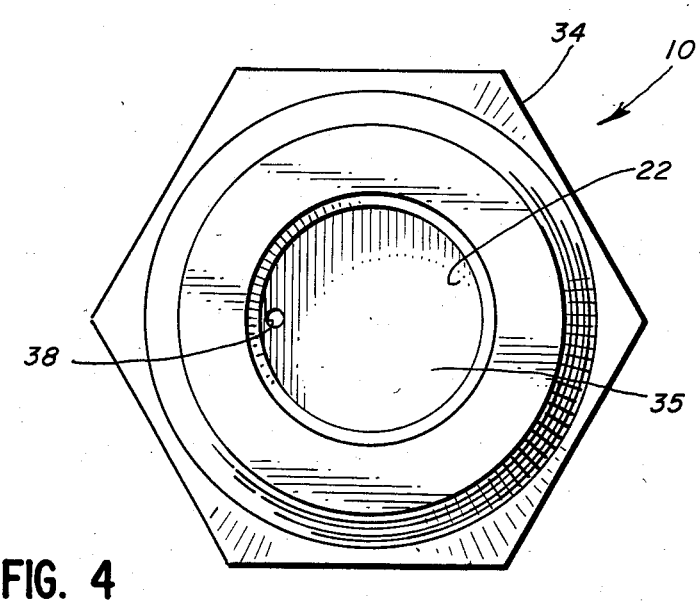
FIG. 4

MULTIPLE STAGE DEVICE FOR CONDENSATE REMOVAL FROM A STEAM PIPING SYSTEM

CROSS REFERENCE TO RELATED APPLICATION

This application is related in subject matter to the concurrently filed and copending application of Michael Troy, entitled Valve Assembly for Purging Particulates from a Steam Piping System, Ser. No. 577,688 filed Feb. 7, 1984, owned by the same Assignee and incorporated herein by reference.

BACKGROUND OF THE INVENTION

This invention relates to devices for drainage of condensate from steam systems, and more particularly, to orifice-type condensate drainage devices.

In typical steam piping systems, devices are provided for drainage of condensate which accumulates in the steam line. Older equipment, such as the widely employed inverted bucket condensate trap, has increasingly been replaced with more simplified orifice devices described, for example, in U.S. Pat. No. 4,426,213, which is incorporated herein by reference. In such orifice devices, the condensate obstructs the passage of steam through the orifice in order to minimize steam loss while permitting drainage of the condensate.

Variation in the pressure and volumetric capacity of the steam and condensate in different steam systems has generally been accommodated by varying the size of the orifice to provide the required flow constriction for proper condensate drainage. In systems requiring small condensate drainage capacity or in systems requiring high pressure steam, drainage devices which have very small orifice diameter, as small as 0.02 inch, have been employed to limit the steam losses. However, the small orifices are susceptible to plugging caused by deposits of calcium carbonate, copper, and oxides of copper which often are entrained in the mixture of steam and condensate.

British Pat. No. 432,033 describes a "steam trap" device for drainage of condensate in which a plurality of condensate drainage nozzles, having "channels", provided with expansion chambers within the nozzles are connected in series and in parallel within cylindrical tubes formed within a housing. The system of channels is described as automatically providing variable flow capacity to accommodate fluctuations in the quantity of condensate to be drained, while limiting the escape of steam. The small expansion chambers within the drainage nozzles are not exposed to the atmosphere and do not provide cooling from the exterior of the housing.

SUMMARY OF THE INVENTION

A condensate drainage device for a steam system comprising a series-connected arrangement of housings or hollow bodies adapted to be installed in a steam line. Each housing has an orifice or orifice-type nozzle therein of selected internal diameter and configuration communicating with a combination expansion and cooling chamber which may have a filter element therein for entrapping particulate debris in fluid passing therethrough. Each chamber has heat exchanger fins for cooling the chamber. The housings are constructed and arranged to permit variations in the series-connection thereof particularly to effect small condensate drainage capacities over a range of different steam system requirements.

Further, the device embodying the invention can have means for connecting a blow-off valve for purging the steam lines.

BRIEF DESCRIPTION OF THE DRAWING

FIG. 1 is a perspective view illustrating a condensate drainage device embodying the invention installed on an end of a steam line wound around a pipe to be heated by the steam line;

FIG. 2 is an exploded perspective view illustrating the components of the drainage device shown in FIG. 1;

FIG. 3 is a sectional view taken along the line 3—3 in FIG. 1 and in the indicated direction;

FIG. 4 is a sectional view taken along the line 4—4 in FIG. 3, and in the indicated direction; and FIG. 5 is an enlarged and exploded sectional view of the upstream nozzle and adapter shown in FIG. 3.

DETAILED DESCRIPTION OF THE PREFERRED EMBODIMENT

Referring to FIG. 1, an embodiment of the condensate drainage device according to this invention is designated generally by reference character 10. In a typical installation which requires small condensate drainage capacity, device 10 is shown connected at the end of a small diameter steam line 12, known as a "tracer", which can be a copper or steel tubing having a diameter, for example, of approximately one-half inch. The tracer tube 12 is wound around a pipe 14 so that steam in the tracer tube 12 can heat the fluid flowing in pipe 14 to a desired temperature. Typically, many tracers are employed in a petroleum refinery in order to maintain the flowability of refined products. Usually, the volumes of condensate generated in a tracer tube 12 is small, and therefore, the device 10 is designed for correspondingly small condensate drainage capacity in order to minimize steam loss.

As illustrated in FIG. 1, device 10 would be installed in a vertical orientation with its outlet 16 directed downwardly so that condensate can drain from the device even when the flow of steam has been shut off. The self-draining orientation of device 10 is particularly important for outdoor installations in order to prevent the fracturing of the device or its installation due to freezing of a large quantity of accumulated condensate. Thus, manual draining of device 10 is not required after a steam shut-down under freezing conditions. Device 10 is fabricated from suitable metal or metal alloy, for example, brass or stainless steel, having excellent heat conduction properties so as to promote cooling by ambient atmosphere, as described hereinafter in detail.

As illustrated in FIGS. 2 and 3, device 10 includes a first housing and a second housing, designated generally by reference characters 18 and 20, respectively. The first housing 18 has an internally threaded, cylindrical inlet 22 for the entering mixture of condensate and steam. The second housing 20 includes the outlet section 16 from which condensate normally is discharged to ambient atmosphere, as illustrated in FIG. 1. Outlet 16 is externally threaded so that device 10 can be connected to a condensate return line (not shown) or an additional orifice drainage device when required by a particular installation.

Device 10 has been illustrated to receive a "blow-off valve assembly" designated generally be reference character 24. The blow-off valve assembly 24 includes a valve stem 26 which is threaded into a valve housing 28 for longitudinal movement therein to open and close valve 24, as more fully described in the related patent application identified hereinabove. Housing 28 includes an externally threaded nipple 30 which can be engaged in a threaded port 32 through the polygonal configured side wall 34 of the first housing 18. For purposes of the herein invention, the blow-off valve assembly 24 illustrated does not preclude the installation of different valve assemblies.

In order to provide a small condensate flow capacity, device 10 includes a plurality of flow constriction orifices arranged in series so that the pressure at inlet 22 is reduced in cascaded stages and externally cooled expansion chambers between the constriction orifices. As a result, the pressure differential across each constriction orifice is a fraction of the total pressure differential between the inlet 22 and outlet 16. In addition, the cooling and expansion chambers insure sufficient pressure dissipation whereby the diameter of a constriction orifice can be sized large enough to avoid plugging thereof by particulates entrained in the mixture of condensate and steam flowing through the device.

Referring again to FIGS. 2 and 3, the first housing 18 has a first steam expansion and cooling chamber 36. Chamber 36 is formed as a generally cylindrical cavity within peripheral wall 34. The mixture of condensate and steam flows from the inlet 22 by way of a short passageway 38 having a diameter which can be in the range of 0.060 to 0.150 inch, for example, 0.08 inch, through the internal wall 35 into the first expansion chamber 36. Passageway 38 serves as the first, flow constriction orifice as further illustrated in FIG. 4. The cross-sectional area of the chamber 36 compared with that of the passageway 38 can be, for example, in the approximate range of 100:1. The steam flowing from the passageway 38 expands to fill the chamber 36 and condenses, at least partially on the interior surface 34a of wall 34 which has been reduced in temperature by the cooling fins 40 formed on the exterior surface of wall 34.

In addition to providing for expansion and cooling of the steam, chamber 36 also houses a wire mesh, cylindrical screen 42 which filters particulate debris from the mixture of steam and condensate flowing through the chamber 36. Chamber 36 provides a dirt pocket in which large particulates will accumulate as build-up on the interior surface 34a of the wall 34. Cylindrical screen 42 is mounted at an inlet end 36a of chamber 36 against an annular shoulder 35a in the wall 35. The mixture of condensate and remaining steam flows from the chamber 36 into the interior of screen 42 to trap debris and particulates therein. The condensate and steam exit from the interior of the screen 42 through an annular adapter 44 having a short, countersunk channel 44a into which the exit end 42a of the screen 42 is secured by a slight pinching of its end 42a.

Periodically, the particulates which accumulate on the interior surface 34a of wall 34 and on the outside of the screen 42 are removed by live steam in a so-called "blow-off" operation in order to prevent plugging of the chamber 36. In the blow-off operation, the blow-off valve 24 is opened and the dislodged particulates are expelled with the blow-off discharge through the valve 24 as more fully described in the related patent application referred to hereinabove.

Referring to FIGS. 3 and 5, the adapter 44 includes an axial bore 46 extending from a generally conical entrance 44b which is recessed from the interior end of the channel 44a. The bore 46 opens through an externally threaded outlet portion 44c. The bore 46 can have a diameter of, for example, approximately 0.22 inch. A tubular nozzle 48 is frictionally mounted within the bore 46 with a flange 50 formed at the entrance end of the nozzle 48 engaged against the entrance 44b. The nozzle 48 has an internal constricted passageway 52 therethrough, preferably including converging entrance and diverging exit sections 52a and 52b, respectively, as more fully described in U.S. Pat. No. 4,426,213. The passageway 52 serves as the second flow constriction orifice of device 10. The ratio of the cross-sectional area of the narrowest portion of passageway 52 compared to the cross-sectional area of passageway 38 can be approximately 1:10, for example.

The small passageway 52 functions to constrict the flow of the mixture of condensate and remaining steam so that resulting acceleration of the mixture further reduces the pressure of the mixture exiting from the passageway 52 into the second expansion chamber 54 formed within the second housing 20. The housing 20 includes an inlet end 21 which is both internally and externally threaded. The end 21 is threaded into an internally threaded outlet 18a of the first housing 18, and the outlet portion 44c of the adapter 44 is threaded into the inlet end 21 of the second housing 20, as illustrated in FIGS. 2 and 3.

The pressure of the condensate and steam exiting from the nozzle 48 is further reduced by the expansion of the steam to fill the chamber 54 which cools and condenses the steam by transferring heat by way of the cooling fins 65 to ambient atmosphere. The expansion ratio within the chamber 54 can be, for example, approximately 1000:1, based upon the relative cross-sectional area of the chamber 54 and the passageway 52. The steam condensed in the chamber 54 again increases the volume of condensate flowing at reduced pressure from the chamber 54 into a second tubular nozzle 60 to obstruct the flow of any steam which was not condensed in chamber 54.

The second nozzle 60 includes a third flow constriction passageway 62 both of which can be similar to nozzle 48 and passageway 52 in configuration and dimension. The narrowest section in passageways 52 and 62 can have a diameter, for example, in the range 0.030 to 0.060 inch. The nozzle 60 is frictionally mounted in a bore 64 formed in outlet 16 so that passageway 62 opens therethrough to discharge the condensate from device 10. The bore 64 is recessed from a short channel 66 at the exit end of chamber 54.

Variations in the size and structural features of cooperating parts and in material used may occur to the skilled artisan without departing from the crux of the invention. For example, the drainage device can have a single expansion and cooling chamber connected between two constricted passageways, and any number of additional stages of expansion chambers and constricted passageways can be employed in series. Similar variations are contemplated within the scope of the invention which is set forth in the claims hereto appended.

I claim:

1. A device for drainage of condensate from a steam piping system with minimized passage of live steam comprising:

A. a body having a conduit therethrough provided with an inlet and outlet, said body including a peripheral wall having an exterior surface exposed to ambient atmosphere;

B. at least first and second constricted passageways within said body communicating with said conduit for constricting the flow of a mixture of condensate and steam flowing therethrough;

C. an expansion and cooling chamber defined by said peripheral wall communicating between said first and second passageways and dimensioned to enable expansion and reduction in the pressure of steam flowing from said first passageway into said chamber prior to constriction of the flow of condensate and any remaining steam flowing downstream into said second passageway, said first passageway being formed through an internal wall positioned between said inlet and said chamber, said first passageway and said chamber having internal cross-sectional areas which differ by at least one order of magnitude;

D. said chamber operable to transfer heat to ambient atmosphere through said wall whereby to effect condensation of steam in said chamber, and including filter means in said chamber for filtering particulate debris from said mixture of steam and condensate flowing through said chamber, said filter means comprising a cylindrical filter screen supported at one end thereof by said internal wall substantially centered in said chamber and at the other end by means supporting said second constricted passageway, said first passageway communicating with said chamber externally of the filter screen; and E. a blow-off valve assembly connected to said body, said assembly including a channel having a fluid entrance communicating with said first chamber for purging debris accumulated by said filter means.

2. The device as claimed in claim 1 wherein said wall includes external heat transfer means.

3. The device of claim 2 wherein said heat transfer means comprises a plurality of projecting fin formations.

4. The device claimed in claim 1 wherein said body includes a second expansion and cooling chamber disposed in downstream communication with said second passageway and dimensioned to enable expansion of steam flowing from said second passageway into said second chamber, said second chamber being formed contiguous to a second portion of said wall in order to enable transfer of heat from said second chamber through said second portion to the ambient atmosphere for condensing steam in said second chamber.

5. The device claimed in claim 4 wherein said body includes a third constricted passageway disposed in downstream communication with said second chamber for reducing the pressure and constricting the flow of condensate from said second chamber.

6. The device claimed in claim 1 wherein at least one of said passageways is provided within a nozzle mounted in a cylindrical bore in said body.

7. The device claimed in claim 6 wherein said passageway in said nozzle includes a converging entrance section and a diverging exit section.

8. The device as claimed in claim 1 wherein each said wall includes a plurality of outwardly projecting fins increasing the area of said surface exposed to the atmosphere.

9. The device claimed in claim 1 wherein at least one of said passageways is formed within a nozzle mounted in a cylindrical bore formed within said body.

10. The device claimed in claim 1 wherein said passageway in said nozzle includes a converging entrance section and a diverging exit section formed therein.

11. The device claimed in claim 1 further comprising a valve assembly connected to said first housing and including a channel having a fluid entrance communicating with said respective chamber for purging debris accumulated by said filter means.

* * * * *